(12) United States Patent
Johnson

(10) Patent No.: US 7,145,547 B2
(45) Date of Patent: Dec. 5, 2006

(54) ELECTROPHORETIC DISPLAY DEVICE

(75) Inventor: Mark Thomas Johnson, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 14 days.

(21) Appl. No.: 10/531,613

(22) PCT Filed: Sep. 12, 2003

(86) PCT No.: PCT/IB03/03928

§ 371 (c)(1),
(2), (4) Date: Apr. 14, 2005

(87) PCT Pub. No.: WO2004/036305

PCT Pub. Date: Apr. 29, 2004

(65) Prior Publication Data

US 2005/0270267 A1 Dec. 8, 2005

(30) Foreign Application Priority Data

Oct. 18, 2002 (EP) ................................. 02079333

(51) Int. Cl.
G09G 3/34 (2006.01)
(52) U.S. Cl. ...................... 345/107; 359/296
(58) Field of Classification Search ................ 345/107; 359/296
See application file for complete search history.

(56) References Cited

U.S. PATENT DOCUMENTS

| 6,462,859 | B1* | 10/2002 | Bastiaens et al. | 359/296 |
| 6,538,801 | B1* | 3/2003 | Jacobson et al. | 359/296 |
| 6,741,385 | B1* | 5/2004 | Ikeda et al. | 359/296 |
| 6,822,783 | B1* | 11/2004 | Matsuda et al. | 359/296 |
| 2005/0012707 | A1* | 1/2005 | Liu | 345/107 |

* cited by examiner

Primary Examiner—Sumati Lefkowitz
Assistant Examiner—Rodney Amadiz
(74) Attorney, Agent, or Firm—Aaron Waxler; Paul Im

(57) ABSTRACT

The invention relates to a display device for displaying information comprising a plurality of display elements with an electrophoretic medium, a first electrode (6), a second electrode (6') and a third electrode (7) associated with each display element for receiving a drive signal, and control means for supplying, in correspondence with the information to be displayed, the drive signal to the electrodes for realizing intermediate optical states. In order to omit reset pulses, which cause a temporary blanking of the display device, the electrophoretic medium of the display device comprises two groups of electrophoretic particles, one group of positively charged electrophoretic particles (14) and one group of negatively charged particles (14') and the color of the electrophoretic particles of the first group is equal to the color of the electrophoretic particles of the second group.

Figure 1:
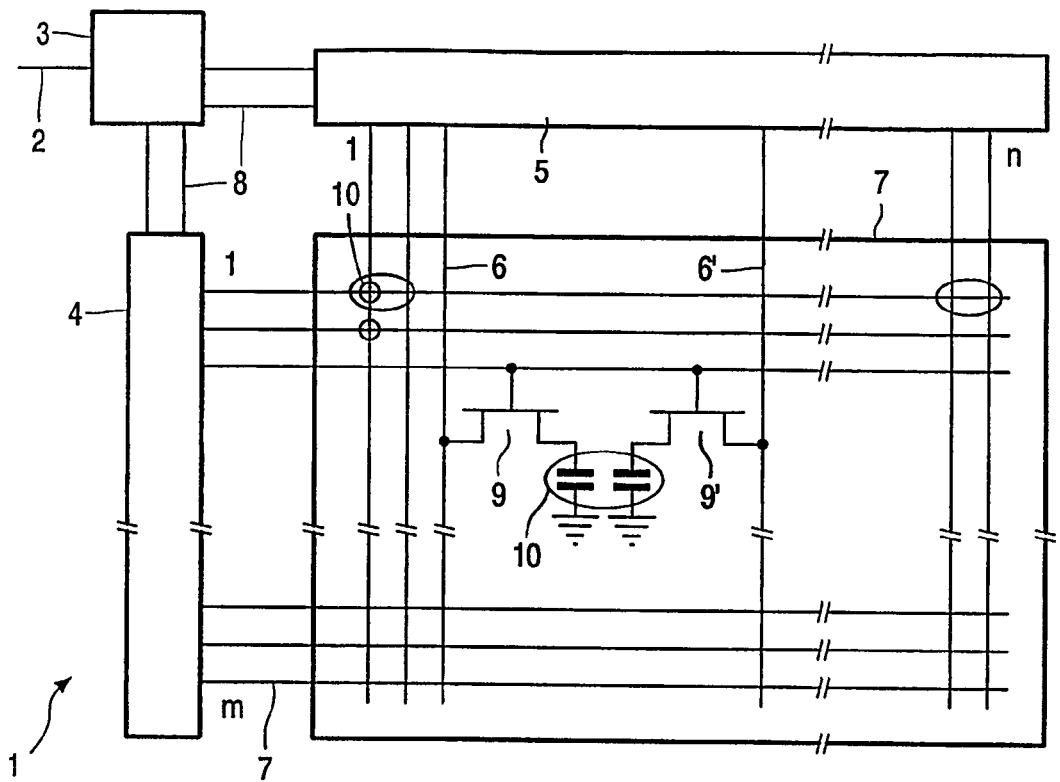

9 Claims, 3 Drawing Sheets dELECTROPHORETIC DISPLAY DEVICE

The invention relates to a display device for displaying successive images comprising a plurality of display elements with an electrophoretic medium.

Electrophoretic display devices are based on the motion of charged, usually color particles under the influence of an electric field between two extreme states having a different transmissivity or reflectivity. With these display devices, dark (colored) characters can be imaged on a light (colored) background, and vice versa Display devices of this type are used in, for example, monitors, laptop computers, personal digital assistants (PDAs), mobile telephones and electronic books.

A display device of the type mentioned in the opening paragraph is described in the unpublished international patent application IB02/00611. This patent application describes a electronic ink display comprising two substrates, one of which is transparent, the transparent substrate being provided with row and columns electrodes. A crossing between a row and a column electrode is associated with a display element. The display element is coupled to the column electrode via a thin film transistor (TFT), the gate of which is coupled to the row electrode. This arrangement of display elements, TFT transistors and row and column electrodes together forms an active matrix. Furthermore, the display element comprises a first electrode, a second electrode and a third electrode. A row driver may select the first electrodes of the display elements via thin-film transistors whose gate electrodes are connected to the row electrodes and whose source electrodes are connected to the column electrodes. The data signal on the first column electrode is transferred to the first electrode via the TFT coupled with the drain electrode. Furthermore, in each display element the second electrode is connected to additional drive means via an additional TFT and an additional column electrode for receiving a second data voltage for realizing the intermediate optical state. The third electrode is connected to, for example, ground by means of one or more common counter electrodes. Furthermore, an electronic ink is provided between the first electrode, the second electrode and the common electrode. The electronic ink comprises multiple microcapsules, of about 10 to 100 microns. Each microcapsule comprises positively charged black particles suspended in a white fluid. When a positive voltage V is applied to the first electrode and the second electrode, the black particles move to the side of the microcapsule directed to the lowest potential, in this case the third electrode. In case the display device is viewed from the side of the transparent substrate comprising the first and second electrodes, the display now has the color of the fluid, in this case white. To obtain an intermediate optical state, for example, the second electrode is connected to ground, while the first electrode is connected to a negative voltage V- and the third electrode is connected to ground. The positively charged black particles move to the lowest potential, in this case an area around the first electrode. When the display device is viewed from the side of the transparent substrate, the display element has only partly the color of the black particles and partly the color of the fluid. A gray value is thereby obtained. Intermediate optical states, gray scales, can be created in the display device by controlling the amount of particles that move to the first and second electrodes at the top of the microcapsules. For example, by controlling the electric field lines between the first electrode, the second electrode and the third electrode, more or fewer particles move towards the area between the first and second electrodes and different intermediate optical states (gray values) can be obtained.

In the known display devices it is required, in order to improve the reproducibility of the intermediate optical states, to bring the pixel to a defined state prior to selection, for example by giving a reset pulse which causes the charged particles to spread uniformly across the third electrode in advance. A disadvantage of the known display is that this reset pulse results in a temporary blanking of the screen and is incompatible with slow video reproduction.

It is an object of the invention to provide a display device of the type mentioned in the opening paragraph which does not have a temporary blanking.

To achieve this object, a first aspect of the invention provides a display device as specified in Claim 1.

The invention is based on the recognition that particles realizing the intermediate optical state of information to be displayed, should be removed from the areas between the first and the second electrode when realizing a subsequent intermediate state of the subsequent image, so that substantially no remaining particles can influence the intermediate optical state of the subsequent image.

Using two groups of particles with the same color but with a first group of positively charged particles and a second group of negatively charged particles makes it possible that when no reset pulses between subsequent images are required appropriate voltages are supplied to the electrodes. When appropriate voltages are supplied to the pixel electrodes particles of the first group move to an area between the first and the second electrode in accordance with the desired intermediate optical states and particles of the second group move to the third electrode. In a next subsequent image the voltages supplied to the electrodes can be selected such that the particles of the first group are released from the area between the first and the second electrode and the particles of the second group move to the area between the first and the second electrode in accordance with the intermediate optical states of the second subsequent image.

A particular embodiment of the invention is specified in claim 2 by alternating the groups of charged particles forming the intermediate optical state, reset pulses are not required anymore, so temporarily blanking the display is substantially eliminated.

Further advantageous embodiments of the invention are specified in the further dependent claims.

In an embodiment as specified in claim 3 reproducibility can be further improved by supplying a preset signal before the drive signal. In this embodiment the electrophoretic particles are released from the electrodes before they are directed to a new position according to the subsequent drive pulse.

Preferably, the preset pulse is of opposite polarity to the polarity of the pulse of the drive signal.

In an embodiment of claim 5 a preset signal consisting of an even number of preset pulses of opposite polarity can be generated for minimizing the DC component and the visibility of the preset pulses of the display device. Two preset pulses, one with positive polarity and one with negative polarity will minimize the power dissipation of the display device within this mode of operation.

In an embodiment as specified in claim 7 the particles are present in a fluid between the substrates. Alternatively, it is possible that the particles are present in a microcapsule.

In an embodiment as specified in claim 8 the surface of the substrate comprising the third electrode is provided with hydrofobic, for example a layer of tetrafluorethyleen. This provides a slippery layer so that the particles attracted to this substrate by the potential of the third electrode are distributed more homogeneously.

These and other aspects of the invention are apparent from and will be elucidated with reference to the embodiments described hereinafter.

Figure 2A:
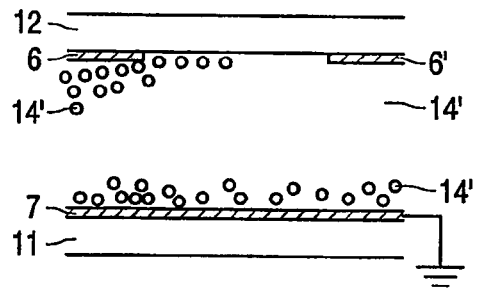
Figure 2B:
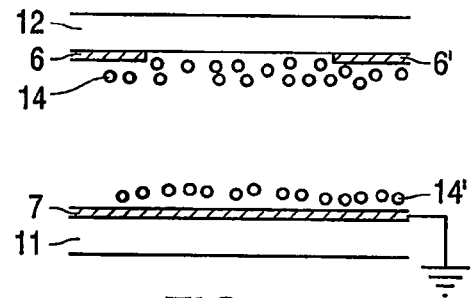
Figure 2C:
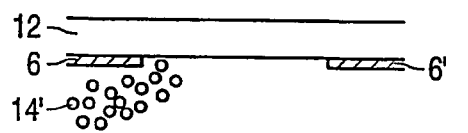
Figure 2C:
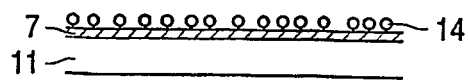
Figure 3:
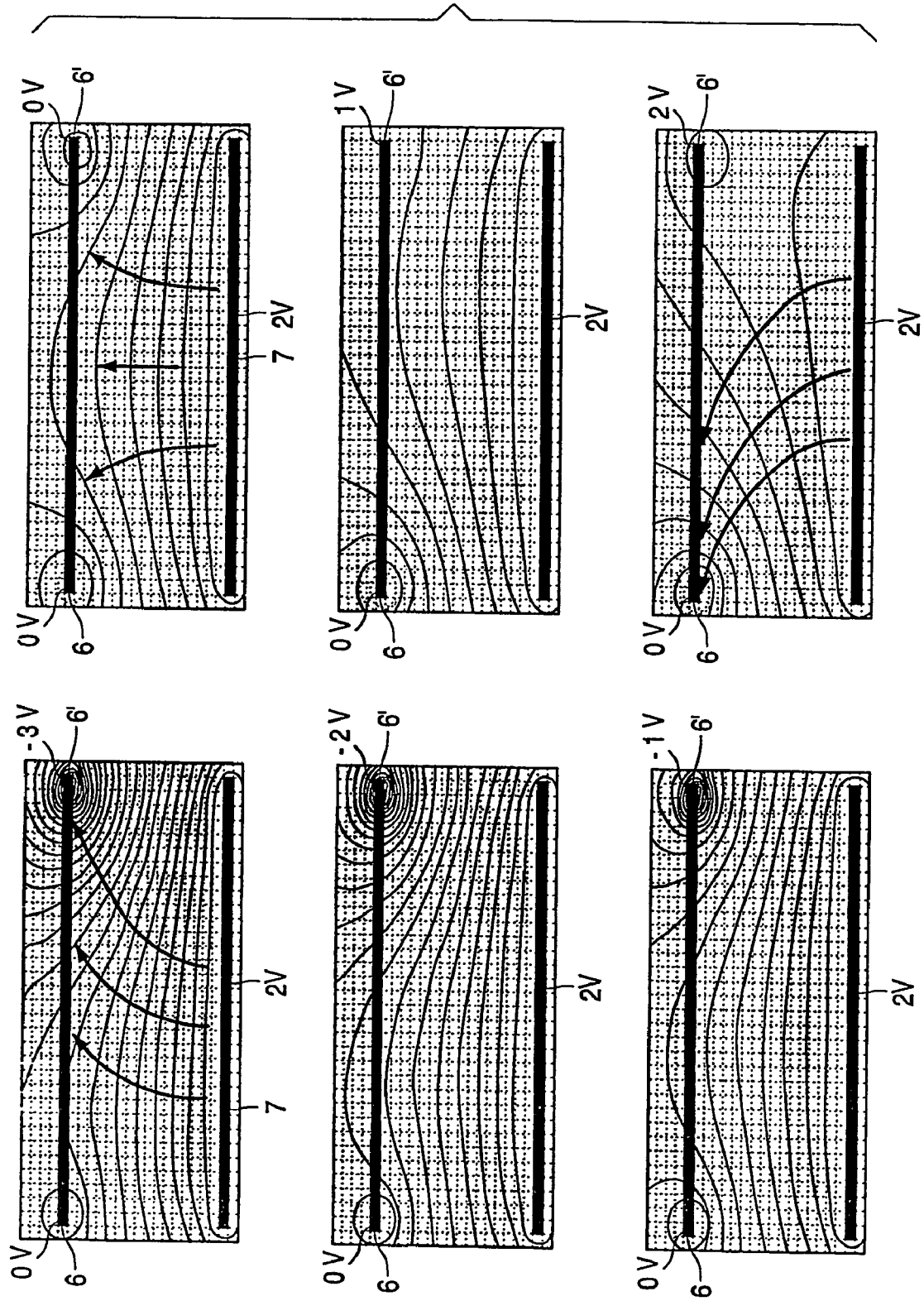
Figure 4:
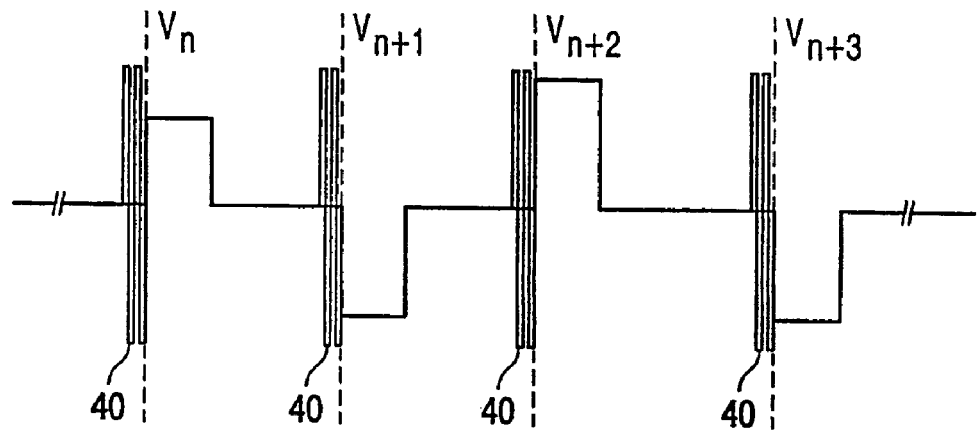
Figure 5:
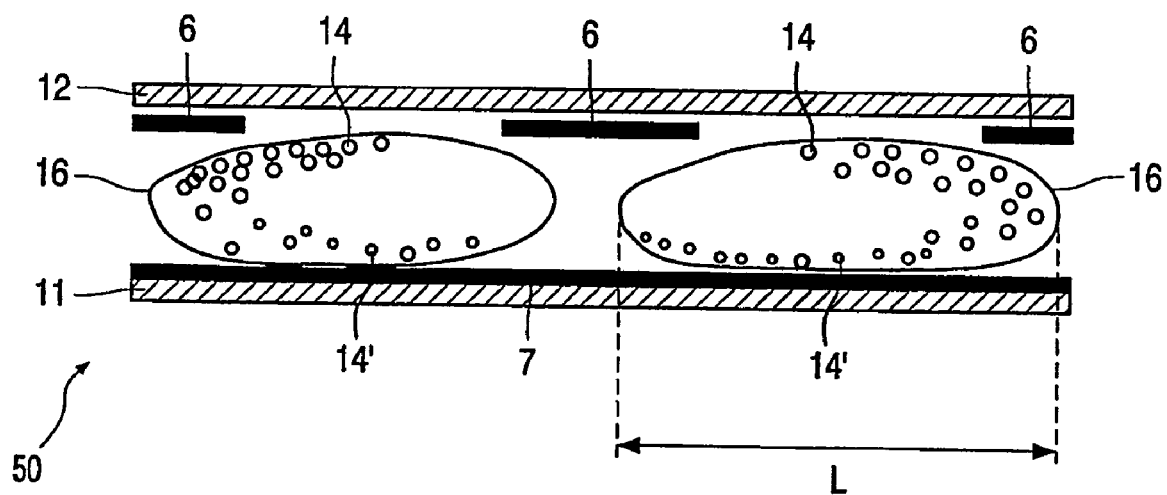

In the drawings:

FIG. 1 shows diagrammatically a portion of a display device,

FIG. 2 shows a pixel of an electrophoretic display device in which different gray values or intermediate optical state have been realized, FIG. 3 shows electrical field lines in a pixel of an electrophoretic display device, FIG. 4 shows 4 prepulses preceding a data signal for supply to a pixel electrode of an electrophoretic display device and FIG. 5 shows a pixel of an electrophoretic display device provided with micro capsules comprising charged electrophoretic particles.

The Figures are schematic and not drawn to scale, and, in general, like reference numerals refer to like parts.

FIG. 1 diagrammaticaly shows an electrical equivalent of a part of display device 1 to which the invention is applicable. It comprises a matrix of pixels 10 in the area of crossings of row or selection electrodes 7 and two column or data electrodes 6,6'. The row electrodes are consecutively selected by means of a row driver 4, while the column electrodes 1,1' to n, n' are provided with data via a data register 5. To this end, the incoming data 2 are first processed, if necessary, in a processor 11. Mutual synchronization between the row driver 4 and the data register 5 takes place via drive lines 8.

Drive signal from the row driver selects the picture electrodes via thin-film transistors (TFTs) 9,9' whose gate are electrically connected to the row electrodes 7 and whose source electrodes 21 are electrically connected to the column electrodes 6,6' respectively. The signal at the first column driver 6 is transferred to the first picture electrode via the TFT 9. The signal at the second column driver 6' is transferred to the second picture electrode via the TFT 9'. The third picture electrode if the pixel 10 is connected to ground, for example, by means of one or more counter electrodes. In the example of FIG. 1 such TFTs 9, 9' are shown diagrammatically for only one pixel 10.

FIG. 2A shows a pixel comprising a first substrate 11, for example a glass or a synthetic material, provided with the third electrode 7, a second, transparent substrate 12 provided with a first electrode 6. The pixel is filled with an electrophoretic medium, for example, a white fluid containing positively charged black particles 14 and negatively charged black particles 14'. The second, transparent substrate further comprises a second electrode 6' so as to realize intermediate optical states via electric voltages across the second electrode 6'. The voltage across this third switching electrode 6' influences the switching behavior between the two optical states.

For example, in FIG. 2A, a first optical state is created. Thereto, the third electrode 7 is connected to ground, while one of the first and second electrodes 6 is connected to a first voltage +V1 and the other one of the first and the second electrode 6' is connected to a second voltage V2, whereby V1>V2>0, the black positively charged particles 14 move towards the electrode at the lowest potential, in this case, the third switching electrode 7. The black negatively charged particles 14' move towards the electrode at the highest potential in this case the first electrode 6 and are present in the area directly under the first electrode 6. Viewed from the viewing direction 15, the pixel now has substantially the color of the fluid 13, except for the portion near the first electrode 6, which pixel color is near-white in this example. An extreme optical state is realized with the example in FIG. 2B. In FIG. 2B the third electrode 7 is connected to ground, while both the first and second electrodes 6,6' are connected to a voltage −V. The positively charged, black particles 14 move towards the lowest potential, in this case towards the potential plane defined between the first and second electrodes 6,6' parallel to and alongside of the first substrate 12 and the negatively charged black particles 14' move towards the highest potential in this case towards the potential plane defined by the third electrode 7. Viewed from the viewing direction 15, the pixel now has the color of the black particles 14. A similar optical state arises in case the first and second electrodes 6,6' are connected to a voltage +V and the third electrode 7 is connected to ground. The negatively charged black particles 14' move towards the highest potential, in this case to the potential plane parallel and alongside of the first substrate 12 and the positively charged black particles 14 move towards the lowest potential, in this case towards the potential plane defined by the third electrode 7. When viewed from the viewing direction 15, the pixel also has the color of the black particles.

In FIG. 2C, in order to create intermediate optical states the first electrode 6 is connected to a first voltage +V1, the second electrode 6' is connected to a third voltage +V3 whereby V1>V3>0 and V3<V2, and the third electrode 7 is connected to ground. The positively charged black particles 14 move towards the lowest potential, in this case an area around the third electrode 7. The negatively charged black particles 14' move towards an area around the first electrode 6. Viewed from the direction 15, the pixel has now partly the color of the black particles and partly the color of the white fluid. A gray hue is thereby obtained. By variation of the magnitude of the voltage V3 supplied to the second electrodes 6' different gray shades can be obtained. FIG. 3 shows potential lines for 4 possible combinations of voltages across the electrodes 6,6' and 7 and arrows 16 diagrammatically showing the forces exerted on positively charged particles. In this way a first image having a first gray hue can be displayed on the display. A consecutive second image having a second gray hue is displayed by connecting the first electrode 6 to a negative first voltage −V1 and the second electrode 6' to a negative voltage −V3, whereby V1<V3<0, while the third electrode 7 remains connected to ground. In this case the positively charged particles 14 move towards the lowest potential, in this case an area near the first electrode 6. The negatively charged particles 14' move towards an area near the third electrode 7, a new gray hue is thus obtained. The amount of black particles 14 present under the substrate 12, and thus the gray hue, depends on the magnitude of the voltages V1, V3 on the first and second electrodes 6,6'. A next consecutive image is displayed by connecting the first electrode 6 again to a positive voltage +V1 and the second electrode 6' again to a positive voltage +V3. Each further consecutive image is displayed by alternating the polarity of the voltages V1, V3 supplied to the first and second electrodes 6,6' respectively, with respect to the third electrode 7. An advantage of this display compared to conventional electrophoretic displays is that a consecutive image can be displayed without applying a reset pulse which releases all particles 14,14' from the first substrate 12. In this way a temporary blanking of the display screen is prevented.

Preferably, before each new image a small number of prepulses are supplied to the first and second electrode 6,6' preceding the data pulses V1,V3 in order to improve the response time. FIG. 4 shows a combination of four prepulses 40 and data pulses $V_n$, $V_{n+1}$, $V_{n+2}$, $V_{n+3}$ supplied to one or both of the electrodes 6,6' of the pixel 10. The magnitude and duration of the prepulses 40 supplied to the first electrode 6 are associated with an energy sufficient for releasing the electrophoretic particles 14,14' in a first area near the first electrode 6 but too low to move them to an area near the third electrode 7. Preferably, the polarity of the last prepulse 40 is opposite to that of the voltage V1,V3 supplied to the first and second electrodes 6,6'. Alternatively, the prepulses 40 can be supplied to the third electrode 7 before the voltages V1, V2 are supplied to the electrode 6,6'.

The substrates 11,12 may be provided with a hydrofobic layer, for example tetrafluorethylene to prevent sticking of the charged particles 14,14' to the substrates.

Alternatively, the particles can be encapsulated in microcapsules as described in "Micro-encapsulated Electrophoretic Materials for Electronic Paper Displays, 20$^{th}$ IDRC conference, pp. 84–87 (2000)". The electrophoretic medium, the fluid comprising the positively charged particles 14 and the negatively charged particles 14', is now present in microcapsules 16 in a transparent substrate or binder.

FIGS. 5A and 5B shows a cross-section 50 of a portion of the display device containing two micro-capsules 16, the third electrode 7 is again connected to ground, while the first and second electrodes 6,6' are connected to a voltage V1, V2 respectively. The size L of micro-capsules 16 in a lateral direction is approximately equal to the distance between the first and second electrodes 6,6'.

It will be obvious that many variations are possible within the scope of the invention without departing from the scope of the appended claims.

The invention claimed is:

1. An electrophoretic display device for displaying information, comprising a plurality of display elements with an electrophoretic medium comprising two groups of electrophoretic particles, one group of positively charged electrophoretic particles and one group of negatively charged particles and a color of the electrophoretic particles of the first group being equal to a color of the electrophoretic particles of the second group, a first electrode, a second electrode and a third electrode associated with each display element for receiving a drive signal, and control means for supplying, in accordance with information to be displayed, a drive signal to the electrodes for realizing intermediate optical states.

2. An electrophoretic display device as claimed in claim 1, wherein the information to be displayed comprises successive images and a control means is able to generate a drive signal so that a voltage difference between the first, second electrode and the third electrode respectively is alternately positive and negative in synchronism with the display of each subsequent image.

3. An electrophoretic display device as claimed in claim 1, wherein a control means are further arranged for supplying a preset signal before the drive signal comprising a preset pulse associated with energy sufficient for releasing at least one of the groups of electrophoretic particles from a first position near one of the electrodes on substrates but too low to reach a second position near one of the other electrodes on the substrates.

4. An electrophoretic display device as claimed in claim 3, wherein the preset signal is supplied to one of the first and second electrodes.

5. An electrophoretic display device as claimed in claim 4, wherein the control means are further arranged for generating the preset pulse with a negative or positive polarity and the control means are further arranged for generating the drive signal comprising a pulse with a positive or negative pulse, whereby a polarity of the preset pulse is opposite to a polarity of the pulse of the drive signal.

6. An electrophoretic display device as claimed in claim 3, wherein the preset signal is supplied to the third electrode.

7. An electrophoretic display device as claimed in claim 1, wherein the electrophoretic medium is present between two substrates one of which comprises the first and the second electrode, and the other comprises the third electrode.

8. An electrophoretic display device as claimed in claim 7, wherein a surface of the substrate comprising the third electrode is provided with a hydrofobic layer.

9. An electrophoretic display device as claimed in claim 1, wherein the electrophoretic medium is present in a micro-capsule.

* * * * *